United States Patent [19]

Nijmam et al.

[11] Patent Number: 5,745,877
[45] Date of Patent: Apr. 28, 1998

[54] METHOD AND APPARATUS FOR PROVIDING A HUMAN-MACHINE DIALOG SUPPORTABLE BY OPERATOR INTERVENTION

[75] Inventors: Aloijsius J. Nijmam, Riethoven, Netherlands; Harald Aust; Peter Besting, both of Aachen, Germany; Martin Oerder, Herzogenrath, Germany

[73] Assignee: U.S. Philips Corporation, New York, N.Y.

[21] Appl. No.: 587,190

[22] Filed: Jan. 16, 1996

[30] Foreign Application Priority Data

Jan. 18, 1995 [EP] European Pat. Off. ............ 95200120

[51] Int. Cl.$^6$ ................................................. G10L 5/06
[52] U.S. Cl. ................................... 704/270; 704/251
[58] Field of Search .................... 395/2.6, 2.79, 395/2.81, 2.67, 2.4; 434/185

[56] References Cited

U.S. PATENT DOCUMENTS 4,959,864  9/1990  Van Nes et al. ..................... 395/2.6

Primary Examiner—Kee M. Tung

[57] ABSTRACT

Successive sections of a computer program of a user interactive system are carried out. A user presents successive verbal items such as answers, to verbal items such as questions presented by the system. Each question corresponds to a respective program section. The user item is recognized and a next machine item is presented, if possible and appropriate. The recognizing is evaluated, and on the basis of the evaluating a progress score is kept. If the progress score attains a particular level, the system enables an operator to intervene in the dialogue in an unobtrusive manner. If a plurality of dialogs are supervised in parallel, the enabling is on the basis of a progress ranking among the dialogs. The intervention may be realized by emulating a user item in the form of speech or in the form of a mechanically entered user item.

14 Claims, 2 Drawing Sheets

METHOD AND APPARATUS FOR PROVIDING A HUMAN-MACHINE DIALOG SUPPORTABLE BY OPERATOR INTERVENTION

BACKGROUND TO THE INVENTION

The invention relates to a method of carrying out a human-machine dialog whilst executing successive sections of a computer program of a user interactive system in accordance with successive verbal user items presented by a user as reacting to successive verbal system items presented by the system to the user, each such verbal system item corresponding to a respective program section, said method comprising successive steps of:

a. presentation by the system to the user of a verbal system item corresponding to a program section;

b. recognition by the system of a verbal user item presented by the user to the system.

A method of this kind has been disclosed in U.S. Pat. 4,959,864 (PHN11266) assigned to the present assignee. The known art, during said dialog, records the number of user protests and when scoring of said protests attains a particular score level, the system automatically and unattendedly transits to a more explicit level of reacting. The present inventors have found that in many instances, the user's inability to correctly interact with the machine will render the dialog ineffective, regardless of the care taken in developing the dialogue's organization, as represented by the program. On the other hand, switch-over to a direct dialog with a human operator is sometimes felt by the user person as overbearing. On the other hand, intervention by an operator often necessitates the operator to carry on the dialog up to its end. In this respect, the present invention should allow the operator not only to enter into the dialog, but also to leave the dialog again without the latter's structure becoming disagreeable to the user person. A major cause for the dialog's insufficient progress is that in certain instances the machine has great difficulty to understand the user, either because the user does not understand the machine questions, or more frequently, because the speech recognition proves ineffective viz à viz the particular user. The latter problem can be caused by properties of the user's speech such as a foreign or other accent, or by system problems such as bad line quality in case of a telephone answering system.

SUMMARY TO THE INVENTION

In consequence, amongst other things, it is an object of the present invention to provide a method according to the preamble, where the transition of the system to another level of human interaction is kept more or less invisible. Now, according to one of its aspects, the invention is characterized in that evaluation of a result of said recognition, and reverting to part a. whilst on the basis of said recognition, selecting among a plurality of such program sections each associated to a subsequent verbal system item, and on the basis of said evaluation keeping a progress score pertaining to said dialog, and under control of a particular progress score level enabling a system operator to intervene in said dialog in an unobtrusive manner. In this way, the machine as it were masks the actions by the operator, whilst at the same time allowing the operator intervention to produce either correctly recognizable entries, or such entries that are based on correct understanding of the dialog process.

Advantageously, the method comprises the carrying out in parallel of a plurality of dialogs, whilst comparing and ranking separate progress score levels each pertaining to a respective said dialog, and under control of a particular progress score ranking among said dialogs enabling a system operator to intervene in the associated dialog in an unobtrusive manner. In this way, one or more human operators can supervise a plurality of dialogs that are carried on in parallel, whilst the machine indicates the dialog or dialogs that is or are most in need for human intervention, such as through a relatively slow progress. Alternatively, in certain dialogs, such as those pertaining to a learning system, rather the dialog progressing fastest could warrant intervention.

Advantageously, said enabling allows the system operator to emulate a user person by means of an emulated verbal user item presented to the system. The intervention may be made by keyboard, but it is often faster and more effective to replace a user-provided item, such as an answer to a question, directly by a spoken answer by the operator. The advantage comes about especially if the user is mispronouncing a key word of the answer, such as the name of a town, or generally if the user has impaired speech. On the other hand, mechanical input such as by mouse or keyboard can sometimes be more suitable.

The invention also relates to an apparatus for implementing the method. Further advantageous aspects of the invention are recited in dependent claims.

BRIEF DESCRIPTION OF THE DRAWING

These and other aspects and advantages of the invention will be discussed more in detail hereinafter with reference to disclosure of preferred embodiments, and in particular with reference to the appended Figures, that show.

DETAILED DISCLOSURE OF PREFERRED EMBODIMENTS

Hereinafter, a preferred embodiment of the invention will be disclosed with respect to an enquiry system for train connections. However, many other dialog environments are feasible, such as other enquiry systems, e.g. a telephone directory enquiring system, or a help desk for problems with household appliances or with the filling out of a tax form. Another environment would be a learning system based on a dialog structure. Whereas in an enquiry system, the machine usually poses a series of questions to find out what information the user person eventually wants, in other environments the distribution between questions and answers is less unsymmetric.

Figure 1:
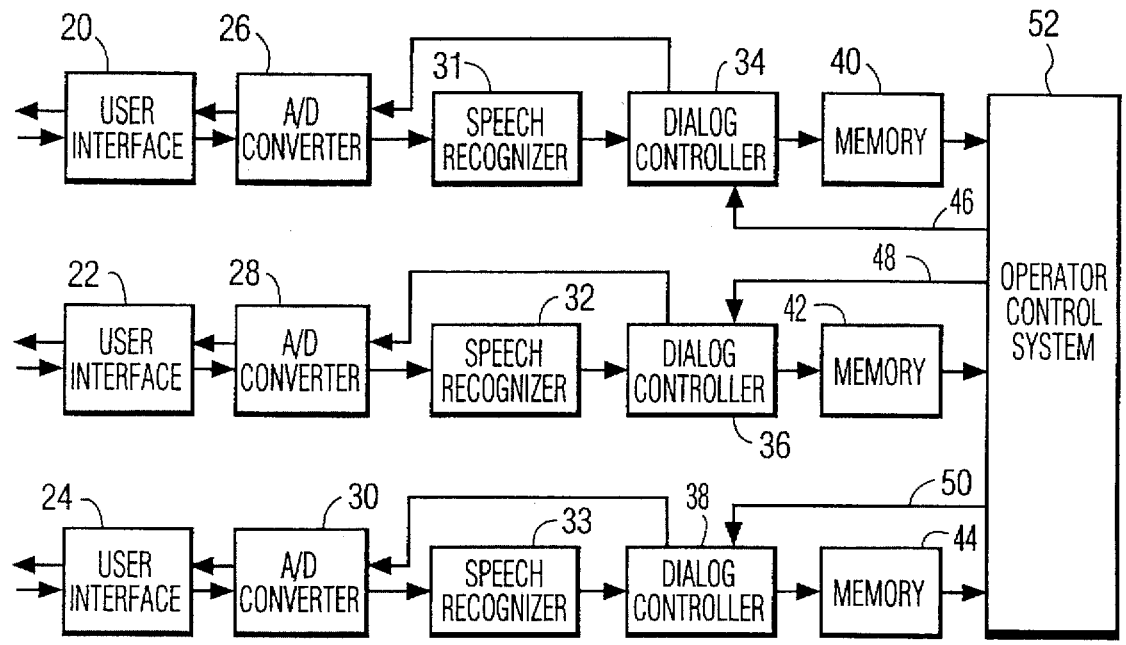
FIG. 1, a multi-dialog system according to the invention.

Now, FIG. 1 shows a multi-dialog system according to the invention for implementing an enquiry system. The system is able to maintain three dialogues in parallel under supervision by a single operator. In practice, these numbers are non-limitative. The system need not be uniform in that other aspects, such as geographical distances, user properties and different operator skills may play a part. The system has three bidirectional user interface devices 20–24, that operate exclusively with an audio channel. An interface device may have a loudspeaker and a microphone. Another solution that these interface devices couple to a telephone line, that may be an ISDN line accommodating digital data transfer. Alternatively, they may be supplemented by a video output channel for more or less persistently displaying key information, such as a list of departure times, recognized town names or fare amounts. Elements 26–30 interface the analog audio channels to the digital data processing in the remainder of the system; in an ISDN-environment, these would not be necessary. Now, the audio input is sampled and digitized. The output packages are converted to analog and if necessary, filtered. Blocks 31, 32, 33 are speech recognizers. For the system according to the embodiment, that was built for the country of Germany, these may recognize a vocabulary of 1100 names of stations and 900 hundred other words, such as times and time qualifiers of day (such as 'early', 'afternoon', name of day and name of month), a set of terms that are privy to the application, such as 'express train', 'quick', 'first class', etcetera, and finally a set of common words. These recognized terms are outputted in the sequence of uttering, and in the form of a bit string code. Blocks 34, 36, 38 represent the respective dialog control that interpret results recognized on various different levels as will be discussed hereinafter, and determine the status of the dialog. If further questions are necessary, these are generated and outputted to associated blocks 26, 28, 30 for presentation to the user. If the control decides that it knows the item that the user person actually wants, this item is also presented to the user in question. Blocks 40, 42, 44 keep track of the recognition processes so far. For example, they may store verbal user items, either in the form as presented for listening in by the operator, or in the form as recognized text for viewing by the operator on a visual operator display not shown explicitly. Also, each block 40–44 keeps a score of the associated progress; this may be in the form of a number or otherwise. Blocks 40–44 output to the operator control system 52. The operator control system may be a full-fledged work station with bidirectional supplementary audio channel not shown, or with only a subset of the facilities that commonly are provided in such work station. In the work station, the progress scores for the respective processes are automatically ranked from 'bad' to 'good', and a selection of the ones with the least progress is visually presented to the operator, preferably in the order of quality, so that the operator would instantly know which dialog would be the one progressing slowest. This presenting may be done in the form of displaying the verbal items exchanged most recently by the machine and by the user in the form of text, in the user's case as far as recognized. Another way of presenting is by replaying the verbal items in the form as actually exchanged, either at their normal speed, or selectably at a higher than normal speed. This will often reveal the verbal user items that were too difficult for the system to recognize. The operator may select one of the dialogs, such as by cursoring an associated display field. Subsequently, the operator via the lines 46, 48, 50 may present emulated user items to the system. As shown, these are coupled in the form of keyed-in user answers into the associated dialog control blocks 34, 36, 38. Another manner would be that the operator by means of speech presents emulated verbal user items to the associated speech recognizer block 31, 32, 33 in a way not shown for clarity. If this operator presentation helps the progress of the dialog in question, the user will receive a verbal machine item that is better suited to his own needs. In many cases, this will render further operator intervention superfluous. In similar way, block 52 may represent two or more operator stations, so that each of the operators can intervene independently in a respective dialog that is progressing too slowly.

Now, the recognition of the verbal user items, which in this embodiment are generally answers to machine-generated questions, may have various outcomes:

1. No speech received: this is treated as a pause in speech, and the system will wait for some time. If the pause is too long, the last question is repeated;

2. No useful content recognized;

3. No content of an expected category recognized, e.g. a question: "what class of transportation do you want?" is answered by "wednesday"; in these cases the system repeats the last question, preceded by a statement "I did not understand your answer". However, an unexpected answer may be a reasonable one to another question, such as the next one to be presented by the system. In the latter case, the next system question contains the content of the most recent answer as a qualifier, and a positive acknowledgement thereof by the user causes the recognized content to be retained for later use.

4. No reasonable content recognized, e.g. an illogical detour is specified; also in this case the procedure of #3 is followed.

5. A sensible and expectable verbal user item is recognized. Thereupon, the system presents the next question to the user, if applicable.

The verbal machine items, generated upon one of the recognition results listed hereabove, may be of various character. However, generally, they are put into a questionary form, while containing such elements that have, sometimes tentatively, been recognized. The effect of such repeating is that the user person often needs to utter only one, or only a few words. Even if the user supplements this minimally required information with extra speech, the recognition or otherwise of the latter is not crucial for the progress of the dialog. Furthermore, in a train connection enquiry system, each eventual machine-generated outcome is a particular train connection that has only a finite set of parameters, such as:

departure station and time arrival station and time intermediate routing and changeovers class: first, second character: local, semi-express, express extras: sleeping car, restaurant car.

This means that the system only needs to have questions answered with respect to each of those parameters and only as far as they are applicable. These limited requirements make the dialog structure relatively simple. Therefore, the dialog control undertakes to successively get answers on all necessary parameter aspects of the eventual outcome, so that the ultimate answer needs to consist of as few train connections as possible, usually no more than two. Specific type of machine questions are:

From (To) what station do you want to travel?

Here the machine undertakes to recognize the destination name, and also to maintain correct linking between the words 'from-to' and the two station names. After recognizing one of the combinations identifying starting point or destination, the machine poses a question about the other end of the journey:

From (To) what station do you want to travel to (from) <name of destination (starting point) station>?

After recognizing the two combinations, the system asks required day and time, whilst repeating the two identifiers of the journey. When the system is not quite sure about the answer(s) received, it may repeat:

So you want to travel from <name> to <name>?

In this way the system proceeds to successively identify the various parameters for pinpointing the target connection. If the user gives statements that are outside the question actually answered, but relevant to the connection to be selected, these items are nevertheless retained in the system and repeated in the next question.

Now, in blocks 40–44 a progress score of the various dialogs is maintained. Various policies thereto are feasible. A first one is to accumulate the number of repeat questions presented to the user after answers that did not lead to any progress in the dialog. This can be combined or not with resetting of the accumulated sum in case of a well-recognized and fully functional answer. A second policy is to accumulate the total number of questions presented by the machine. If this number gets too high, it is proof that the dialog proceeds too slowly. Various other tactics are open to the skilled art practitioner.

Figure 2:
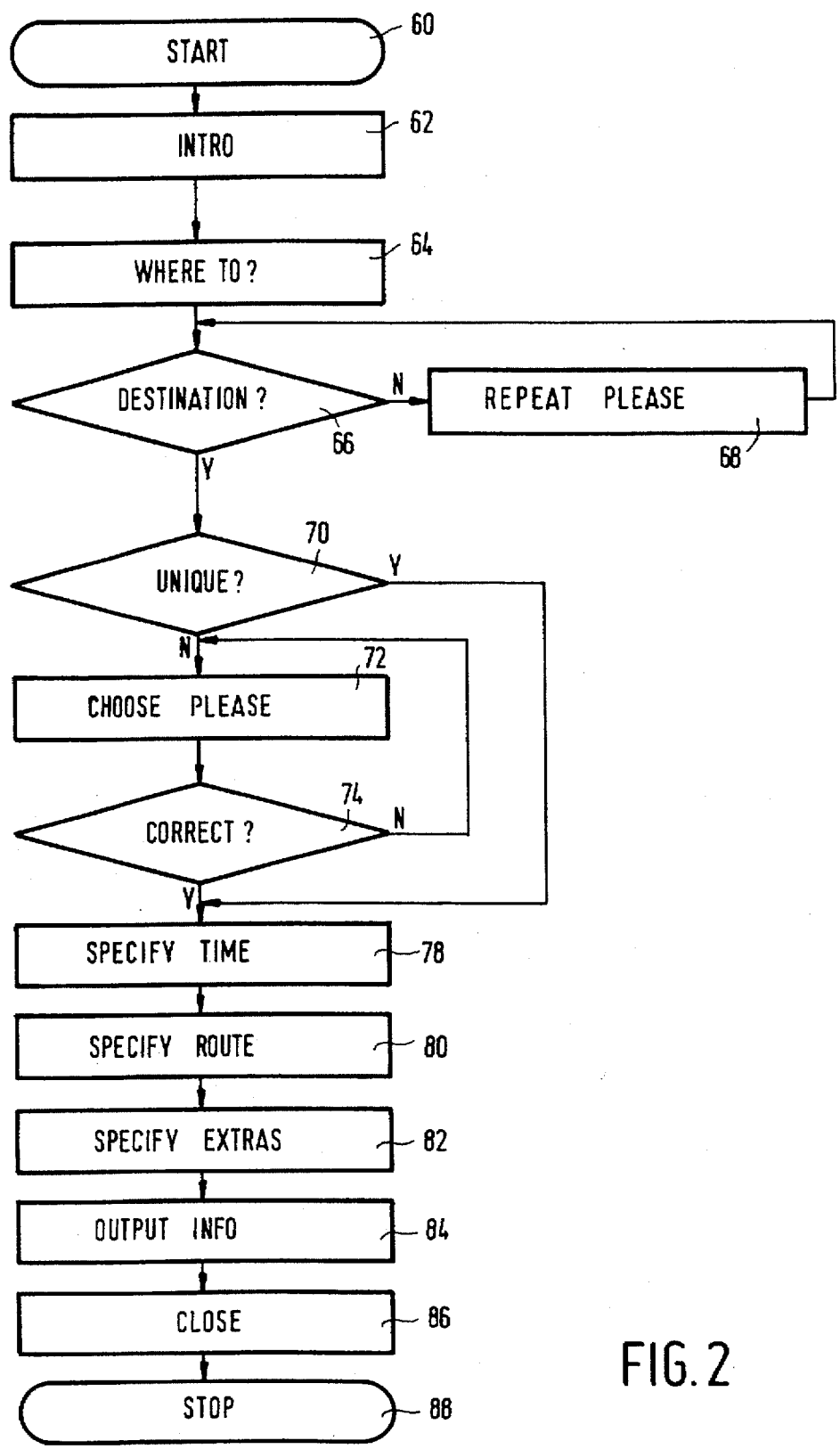
FIG. 2, a flow chart according to the invention.

FIG. 2 shows an exemplary flow chart of a method according to the invention. In the Figure, only a single user process has been shown, inasmuch as a hardware realization pertaining to a plurality of dialogs in parallel has been shown in FIG. 1 already. Furthermore, for reasons of clarity, only an elementary system has been presented. In practice, the structure of the program that generates the dialog is much more complicated. For a more extensive disclosure of such a system, see German Patent Application P 44 32 632.7, corresponding U.S. Ser. No. 08/526,017 to the present assignee, herein incorporated by reference. It is understood that various elements of FIG. 2 can be realized as well in a software context. Now in this Figure, block 60 represents the initializing of the system, or as the case may be, pertaining to only one of the dialogs. Block 62 represents the outputting of an introductory message by the system. Block 64 represents the generating of the first question by the system: "Where do you want to go?". The embodiment relates to the case where the starting point is known, for example, because of the location of the caller. In block 66 the system tries to recognize the next received answer as the name of a destination station. As stated with respect to FIG. 1, various types of unrecognizable or illogical answers may be forthcoming. In any of these cases, the system goes to block 68 and asks the user person to make a new statement indicating the destination. If the problem was unrecognizability of the answer, the statement may have its content adapted to the answer actually received, such as: "<Name> is the station where you are at present; where do you want to go?", in case the user accidentally gave the starting location. A similar phrase applies when the starting location had already been given by the user.

"I did not understand your answer; where do you want to go?", if the recognized message did not contain the name of a relevant station.

"Please repeat your answer", in case the recognition of a name was ambiguous, such as in case where two stations have nearly identical names.

If a correct destination name was recognized, the system goes to block 70 and checks whether the recognized name indicates a unique station, or, given the departure station, only a single station would be relevant. In the positive case, the system goes to block 78. The negative may occur, when a particular city has more than one station. Thereupon, in block 72 the system asks the user to specify which station pertaining to the destination in question. In block 74, the system checks whether a correct indication has been recognized. If no, a similar loop as regarding blocks 66, 68 is executed, which loop has not been shown for clarity. If a correct station name has been recognized, the system goes to block 78. Here, the user is asked to specify the hour of travel, which is treated in similar way as the destination was found in blocks 64–74. In block 80, the user is asked to specify a route. In block 82, the user is asked to specify extras, such as first or second class. In block 84 the system outputs the necessary information, possibly on a display screen or by means of hard copy. In block 86, the session is closed. In block 88, the dialog is terminated. Various additional speech outputs may be given by the system, such as repeating the recognized answer in a textual context, presenting the user with a binary choice, etcetera, but these do not represent elements of the invention proper. The operator may intervene when activation of blocks like block 68 signals that progress is too slow. In that case, the flow diagram of FIG. 2 is either left, when the operator fully takes over, but according to the invention, the operator may also just emulate one of the user items, whereupon the flow chart is traversed in exactly the same way as when a correct answer would have been recognized. The measuring of the progress actually made, may be based on the number of times a repeat block like block 68 is activated. These numbers may be accumulated continually. Various types of non-standard or low progress may cause respective different progress score signallings. Alternatively, a period of fast progress, as measured be securing of successive travel parameters by the system, may actually diminish the score, and thereby change the ranking of the process in question. As stated earlier, the blocks like 78–82 need not be positioned according to a linear sequence, but may be arranged more in parallel, so that their functionalities may be called for in about any stage of the dialog process. Every recognized parameter is then stored as an ultimate parameter of the train connection sought. It should be noted that the present invention does not relate to the structure of the dialog proper, but rather to measures taken when progress is too slow (or too fast).

Figure 3:
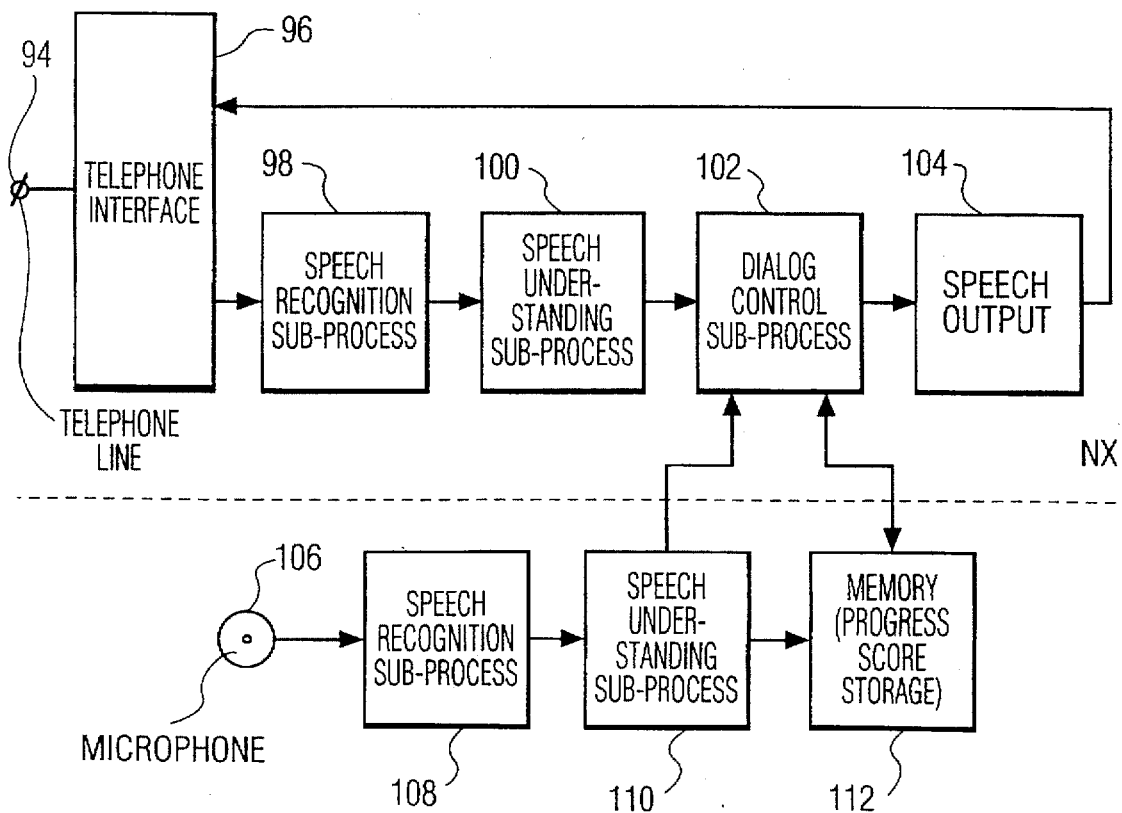
FIG. 3, a functional block diagram of the invention.

FIG. 3 shows a functional block diagram of the invention, in particular as regarding the recognition process. Element 94 is a telephone line connected to telephone interface 96. Block 98 represents the speech recognition sub-process, that will output a string of provisionally recognized words. The string may be a multiple parallel one, in that more than one outcome would be feasible, and may have the character of a trellis. Block 100 represents the speech understanding sub-process. Here, the recognized words are evaluated as to their meaning, such as to whether a station name is recognized in conjunction with a directional qualifier 'to' or 'from', or a time or time interval indication. Block 102 represents the dialog control sub-process that compares the speech understood by block 100 with expectable information in view of one or more most recent questions presented by the system. On account of this, the next question to be presented to the user is selected, or as the case may be, the final answer. Moreover, the dialog control subsystem maintains a progress score in block 112. Under control of block 102, speech output block 104 generates the appropriate speech item for outputting via interface 96. The loop as shown is realized once for each respective dialog. Mapping on shared or separate hardware is left unconsidered. Item 106 represents an operator microphone. Block 108 is a speech recognizer sub-process; block 110 a speech understanding sub-process. The latter outputs to the dialog control sub-process to emulate a user item for enhancing the progress of the dialog in question. The operator control sub-system through interrogating the progress score storage block 112 in a way not shown may select one or more of currently active dialogs as candidate for operator intervention. Again, the blocks 108, 110 may be mapped on hardware that is shared with further (sub-)processes.

We claim:

1. A method of carrying out a human-machine dialog whilst executing successive sections of a computer program of a user interactive system in accordance with successive verbal user items presented by a user as reacting to successive verbal system items presented by the system to the user, each such verbal system item corresponding to a respective program section, said method comprising successive steps of:

a. presentation by the system to the user of a verbal system item corresponding to a program section;

b. recognition by the system of a verbal user item presented by the user to the system;

characterized by:

c. evaluation of a result of said recognition, and reverting to part a. whilst on the basis of said recognition, selecting among a plurality of such program sections each associated to a subsequent verbal system item, and on the basis of said evaluation keeping a progress score pertaining to said dialog, and under control of a particular progress score level enabling a system operator to intervene in said dialog in an unobtrusive manner.

2. A method as claimed in claim 1, wherein said enabling allows the system operator to emulate a user person by means of an emulated verbal user item presented to the system.

3. A method as claimed in claim 2, wherein in said system past verbal user items as recognized are retained for reviewing by the system operator.

4. A method as claimed in claim 3, wherein said system past verbal user items as received are retained for second reviewing by the system operator.

5. A method as claimed in claim 2, wherein in said system past verbal user items as received are retained for second reviewing by the system operator.

6. A method as claimed in claim 5, wherein said second reviewing is effected at raised speed as compared to standard speed of human speech.

7. A method as claimed in claim 1, wherein said enabling allows the system operator to emulate a user person by means of a mechanically entered user item presented to the system.

8. A method as claimed in claim 7, wherein in said system past verbal user items as recognized are retained for reviewing by the system operator.

9. A method as claimed in claim 7, wherein in said system past verbal user items as received are retained for second reviewing by the system operator.

10. A method of carrying out a plurality of human-machine dialogs in parallel whilst for each dialog carrying out successive sections of an associated shared computer program of a user interactive system, in accordance with successive verbal user items presented by its respective user as reacting to successive verbal system items presented by the system to the user in question, each such verbal system item corresponding to a respective program section, said method for each dialog comprising successive steps of:

a. presentation by the system to the user of a verbal system item corresponding to a program section;

b. recognition by the system of a verbal user item presented by the user to the system;

c. evaluation of a result of said recognition and reverting to part a. whilst on the basis of said recognition selecting among a plurality of such program sections each associated to a subsequent verbal system item, and on the basis of said evaluation keeping a progress score pertaining to each respective said dialog;

said method comprising comparing and ranking separate progress score levels each pertaining to a respective said dialog, and under control of a particular progress score ranking among said dialogs enabling a system operator to intervene in the associated dialog in an unobtrusive manner.

11. A method as claimed in claim 10, wherein said enabling allows the system operator to emulate a user person by means of an emulated verbal user item presented to the system.

12. A method as claimed in claim 10, wherein said enabling allows the system operator to emulate a user person by means of a mechanically entered user item presented to the system.

13. A computer apparatus for carrying out a human-machine dialog whilst carrying out successive sections of a computer program of a user interactive system in accordance with successive verbal user items presented by a user as reacting to successive verbal system items presented by the system to the user, each such system item corresponding to a respective program section, said apparatus comprising:

a. presentation means for presenting to the user of a verbal system item corresponding to a program section;

b. recognition means for recognizing a verbal user item presented by the user;

characterized by:

c. evaluation means fed by said recognition means for evaluating a result of said recognition, and having activating means for activating said presentation means, reverting to part a. whilst on the basis of said recognition, selecting among a plurality of program sections each associated to a subsequent verbal system item, and having scoring means fed by said evaluation means for on the basis of said evaluation keeping a progress score pertaining to said dialog, and having an enabling output for under control of a particular progress score level outputting an enabling signal for enabling a system operator to intervene in said dialog in an unobtrusive manner.

14. An apparatus as claimed in claim 13, wherein said evaluation means, recognition means and evaluation means are executed in a multiple way so as to allow simultaneous supporting of a plurality of human-machine dialogs in parallel, and said evaluation means furthermore comprise ranking means for ranking multiple progress scores each associated to a respective said dialog, and said enabling output is fed by said ranking means.

* * * * *